US007268915B2

(12) United States Patent
Fujino

(10) Patent No.: US 7,268,915 B2
(45) Date of Patent: Sep. 11, 2007

(54) IMAGE PROCESSING APPARATUS, IMAGE PROCESSING METHOD, CONTROL PROGRAM, AND RECORDING MEDIUM

(75) Inventor: Reiko Fujino, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1088 days.

(21) Appl. No.: 10/313,028

(22) Filed: Dec. 6, 2002

(65) Prior Publication Data

US 2003/0128380 A1 Jul. 10, 2003

(30) Foreign Application Priority Data

Dec. 10, 2001 (JP) ............................. 2001-376383
Aug. 28, 2002 (JP) ............................. 2002-249477

(51) Int. Cl.
*G06F 15/00* (2006.01)
*H04N 1/36* (2006.01)

(52) U.S. Cl. ........................ 358/1.9; 358/409; 358/1.15

(58) Field of Classification Search ................. 358/1.9, 358/501, 504, 518, 409, 410, 412, 426.09, 358/1.15, 101, 1.12, 530, 1.1, 442, 444, 1.16
See application file for complete search history.

(56) References Cited

U.S. PATENT DOCUMENTS

| 4,769,696 | A | * | 9/1988 | Utsuda et al. ............... 358/527 |
| 4,980,814 | A | * | 12/1990 | Hosaka et al. ................... 700/2 |
| 5,099,260 | A | * | 3/1992 | Sato et al. .................... 347/116 |
| 5,148,293 | A | * | 9/1992 | Miyachi ...................... 358/444 |
| 5,485,245 | A | * | 1/1996 | Kobayashi et al. ............. 399/1 |
| 5,504,669 | A | * | 4/1996 | Wakabayashi et al. .......... 700/2 |
| 5,553,202 | A | * | 9/1996 | Wakabayashi et al. ..... 358/1.16 |
| 5,561,455 | A | * | 10/1996 | Teshigawara et al. ........ 347/131 |
| 5,585,836 | A | * | 12/1996 | Pham et al. ................. 347/237 |
| 5,852,461 | A | * | 12/1998 | Noguchi ...................... 347/116 |
| 6,122,068 | A | * | 9/2000 | Torisawa et al. ............. 358/1.5 |
| 6,192,152 | B1 | * | 2/2001 | Funada et al. ............... 382/199 |
| 6,204,865 | B1 | * | 3/2001 | Noguchi et al. ............ 347/116 |
| 6,252,618 | B1 | * | 6/2001 | Coriale et al. .............. 347/116 |
| 6,281,922 | B1 | * | 8/2001 | Suzuki ....................... 347/235 |
| 6,493,019 | B1 | * | 12/2002 | Hirasawa .................... 347/233 |

(Continued)

FOREIGN PATENT DOCUMENTS

JP          59226564 A  * 12/1984

*Primary Examiner*—Madeleine A V Nguyen
(74) *Attorney, Agent, or Firm*—Fitzpatrick, Cella, Harper & Scinto

(57) ABSTRACT

An object of this invention is to provide an image processing apparatus capable of preventing any color misregistration in printing even when the image processing apparatus is divided into a plurality of semiconductor integrated circuits. An image processing apparatus is used for an image forming apparatus for sequentially printing image processing results of color components by a plurality of photosensitive drums separated by predetermined distances in correspondence with the colors. In the image processing apparatus, a plurality of image processing sections for the respective color components are divided into a plurality of semiconductor integrated circuits. At least two of the plurality of image processing sections have storage sections which adjust the printing timings of the color components corresponding to the distances between the photosensitive drums. The image processing apparatus includes a synchronization circuit which synchronizes, with an image processing clock for image processing, a print request signal from a printer controller. The print request signal synchronized by the synchronization circuit is commonly used to adjust the read timings of the storage sections of the plurality of image processing sections.

8 Claims, 18 Drawing Sheets

U.S. PATENT DOCUMENTS

| | | | |
|---|---|---|---|
| 6,806,894 B2 * | 10/2004 | Seki | 347/135 |
| 7,075,674 B2 * | 7/2006 | Nagumo et al. | 358/1.16 |
| 2001/0033408 A1 * | 10/2001 | Shiraishi et al. | 359/212 |
| 2002/0003557 A1 * | 1/2002 | Miyakoshi et al. | 347/58 |
| 2002/0008859 A1 * | 1/2002 | Kodama et al. | 355/32 |
| 2003/0053156 A1 * | 3/2003 | Satoh et al. | 358/511 |
| 2003/0118231 A1 * | 6/2003 | Uchida et al. | 382/164 |
| 2005/0093969 A1 * | 5/2005 | Takesue | 347/240 |

* cited by examiner

PRIOR ART   F I G.  4

IMAGE PROCESSING APPARATUS, IMAGE PROCESSING METHOD, CONTROL PROGRAM, AND RECORDING MEDIUM

FIELD OF THE INVENTION

The present invention relates to an image processing apparatus, image processing method, control program, and recording medium.

BACKGROUND OF THE INVENTION

In many image processing apparatuses for printing color images, to print at a high speed components (black, cyan, magenta, and yellow) that have undergone image processing, independent photosensitive drums 1, 2, 3, and 4 are physically laid out at predetermined intervals 5, 6, and 7 (to be referred to as drum pitches hereinafter), and a sheet surface 8 is conveyed in a predetermined direction to sequentially print the components, as shown in FIG. 1.

The operation will be described below in detail with reference to FIG. 2.

Image data 23 to 26 of the respective components input from an image input apparatus 10 to an image processing apparatus 11 undergo image processing operations 13 to 16, respectively.

FIG. 2 illustrates input images and output images in the same color space for the descriptive convenience, though the processing is substantially the same even when input images and output components have different color spaces (e.g., RGB inputs and CMYK outputs).

Since the image processing operations for the components are parallelly executed for each pixel, delay amounts generated by the drum pitches are adjusted by storage devices 17 to 19.

To adjust phase differences generated by the drum pitches, the outputs from the image processing operations 14 to 16 are stored in the storage devices 17 to 19, respectively, as needed.

A first output component 27 is output to a printer controller 12 without intervening any storage device because no phase adjustment is necessary for the photosensitive drum 1 of the printer, which prints first.

For a second output component 28, the image-processed data is stored in the storage device 17. In accordance with a read control signal 32 transmitted from a read control circuit 20, the data is read out from the storage device 17 and output to the printer controller 12. At this time, a phase difference corresponding to the drum pitch 5 is adjusted.

For a third output component 29, the image-processed data is stored in the storage device 18. In accordance with a read control signal 33 transmitted from the read control circuit 20, the data is read out from the storage device 18 and output to the printer controller 12. At this time, a phase difference corresponding to the drum pitch 6 is adjusted.

For a fourth output component 30, the image-processed data is stored in the storage device 19. In accordance with a read control signal 34 transmitted from the read control circuit 20, the data is read out from the storage device 19 and output to the printer controller 12. At this time, a phase difference corresponding to the drum pitch 7 is adjusted.

A print request signal synchronization circuit 36 and the read control circuit 20 will be described next with reference to FIGS. 2 and 3.

On the basis of a print request signal 31 from the printer controller 12, the image input apparatus 10 is activated. After image processing by the image processing apparatus 11, the printer controller 12 receives the output data 27 to 30 from the image processing apparatus 11 and prints them by the above-described method.

In such a case, to adjust a delay generated due to the physical characteristic of the electric wire that connects the printer controller 12 to the image processing apparatus 11 or the states of the printer controller 12 and image processing apparatus 11 operating by clocks of different frequencies, the print request signal 31 input from the printer controller 12 is synchronized by an image processing clock 22 and then input to the read control circuit 20. After the synchronization, the read control circuit 20 delays the read control signal 32 on the basis of the print request signal by a time corresponding to the period (drum pitch 5) in which the sheet surface is conveyed from the first photosensitive drum section 1 to the second photosensitive drum section 2, and transmits the delayed read control signal 32 to the storage device 17. Similarly, the read control circuit 20 delays the read control signal 33 on the basis of the print request signal by a time corresponding to the period (drum pitch 6) in which the sheet surface is conveyed from the first photosensitive drum section 1 to the third photosensitive drum section 3, and transmits the delayed read control signal 33 to the storage device 18. In addition, the read control circuit 20 delays the read control signal 34 on the basis of the print request signal by a time corresponding to the period (drum pitch 7) in which the sheet surface is conveyed from the first photosensitive drum section 1 to the fourth photosensitive drum section 4, and transmits the delayed read control signal 34 to the storage device 19.

The circuit that implements the image processing apparatus 11 shown in FIG. 2 cannot be mounted on a single semiconductor integrated circuit in some cases due to its scale. Additionally, in a monochromatic printing system, the image processing apparatus 11 is redundant and increases the cost. Due to the above reasons, the image processing apparatus is sometimes divided into two semiconductor integrated circuits 11A and 11B, as shown in FIG. 4.

The image processing apparatus is present physically as a plurality of semiconductor integrated circuits. In this case, however, when the print request signal input from the printer controller 12 is synchronized with an image processing clock by synchronization circuits 36A and 36B prepared in the respective integrated circuits of the image processing apparatuses, print request signals 35A and 35B after synchronization may have a phase difference. Hence, for example, the read control signal 33 which is expected to change at edge 1 in FIG. 5 may change at edge 2. This causes a color misregistration in the printed picture, resulting in degradation in image quality.

SUMMARY OF THE INVENTION

The present invention has therefore been made in consideration of the above-described problem, and has as its object to provide an image processing apparatus, image processing method, control program, and recording medium, which can prevent any color misregistration even when an image processing apparatus is divided into a plurality of semiconductor integrated circuits.

In order to solve the above-described problem and achieve the object, an image processing apparatus according to the present invention is characterized by having the following arrangement.

That is, there is provided an image processing apparatus which is used for an image forming apparatus for executing image processing for each color component and sequentially printing image processing results of the color components by a plurality of photosensitive drums separated by predetermined distances in a convey direction of a printing medium in correspondence with the colors and in which a plurality of image processing sections which execute image processing for the respective color components are divided into a plurality of semiconductor integrated circuits, wherein at least two of the plurality of image processing sections have storage sections which adjust printing timings of the color components corresponding to the distances between the photosensitive drums, the image processing apparatus comprises a synchronization circuit which synchronizes, with an image processing clock for image processing, a print request signal from a printer controller which controls printing operation, and the print request signal synchronized by the synchronization circuit is commonly used to adjust read timings of the storage sections of the plurality of image processing sections.

An image processing method according to the present invention is characterized by having the following arrangement.

That is, there is provided an image processing method which is used for an image forming apparatus for executing image processing for each color component and sequentially printing image processing results of the color components by a plurality of photosensitive drums separated by predetermined distances in a convey direction of a printing medium in correspondence with the colors and uses an image processing apparatus in which a plurality of image processing sections which execute image processing for the respective color components are divided into a plurality of semiconductor integrated circuits, comprising causing at least two of the plurality of image processing sections to have storage sections which adjust printing timings of the color components corresponding to the distances between the photosensitive drums, and synchronizing, with an image processing clock for image processing, a print request signal from a printer controller which controls printing operation, and commonly using the print request signal synchronized by the synchronization circuit to adjust read timings of the storage sections of the plurality of image processing sections.

A control program according to the present invention is characterized by having the following arrangement.

That is, a control program causes a computer to execute the above image processing method.

A recording medium according to the present invention is characterized by having the following arrangement.

That is, a recording program records the above control program.

Other objects and advantages besides those discussed above shall be apparent to those skilled in the art from the description of a preferred embodiment of the invention which follows. In the description, reference is made to accompanying drawings, which form a part thereof, and which illustrate an example of the invention. Such example, however, is not exhaustive of the various embodiments of the invention, and therefore reference is made to the claims which follow the description for determining the scope of the invention.

DETAILED DESCRIPTION OF THE PREFERRED EMBODIMENTS

The preferred embodiments of the present invention will be described below.

First Embodiment

Figure 1:
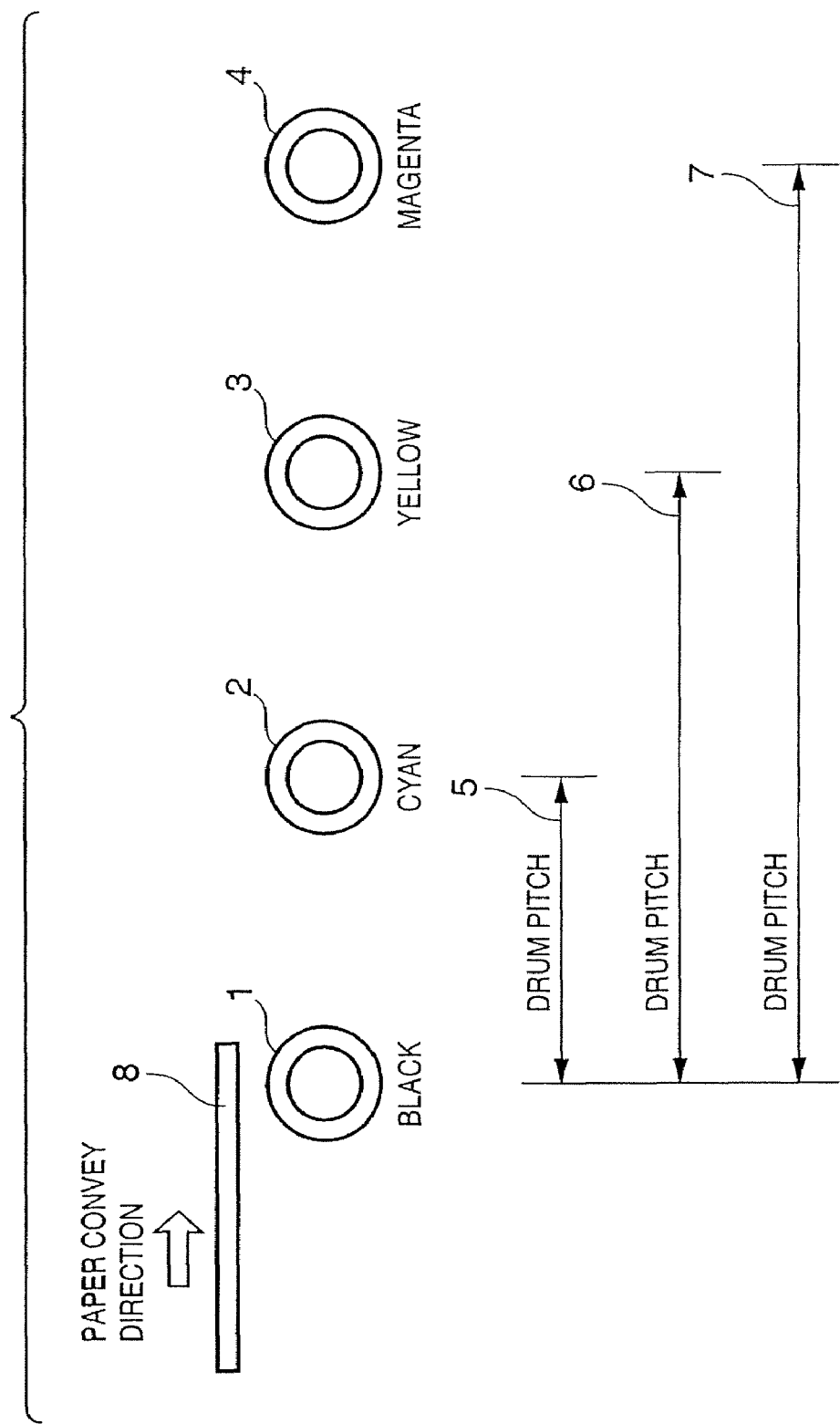
FIG. 1 is a view showing the layout state of photosensitive drums.
Figure 2:
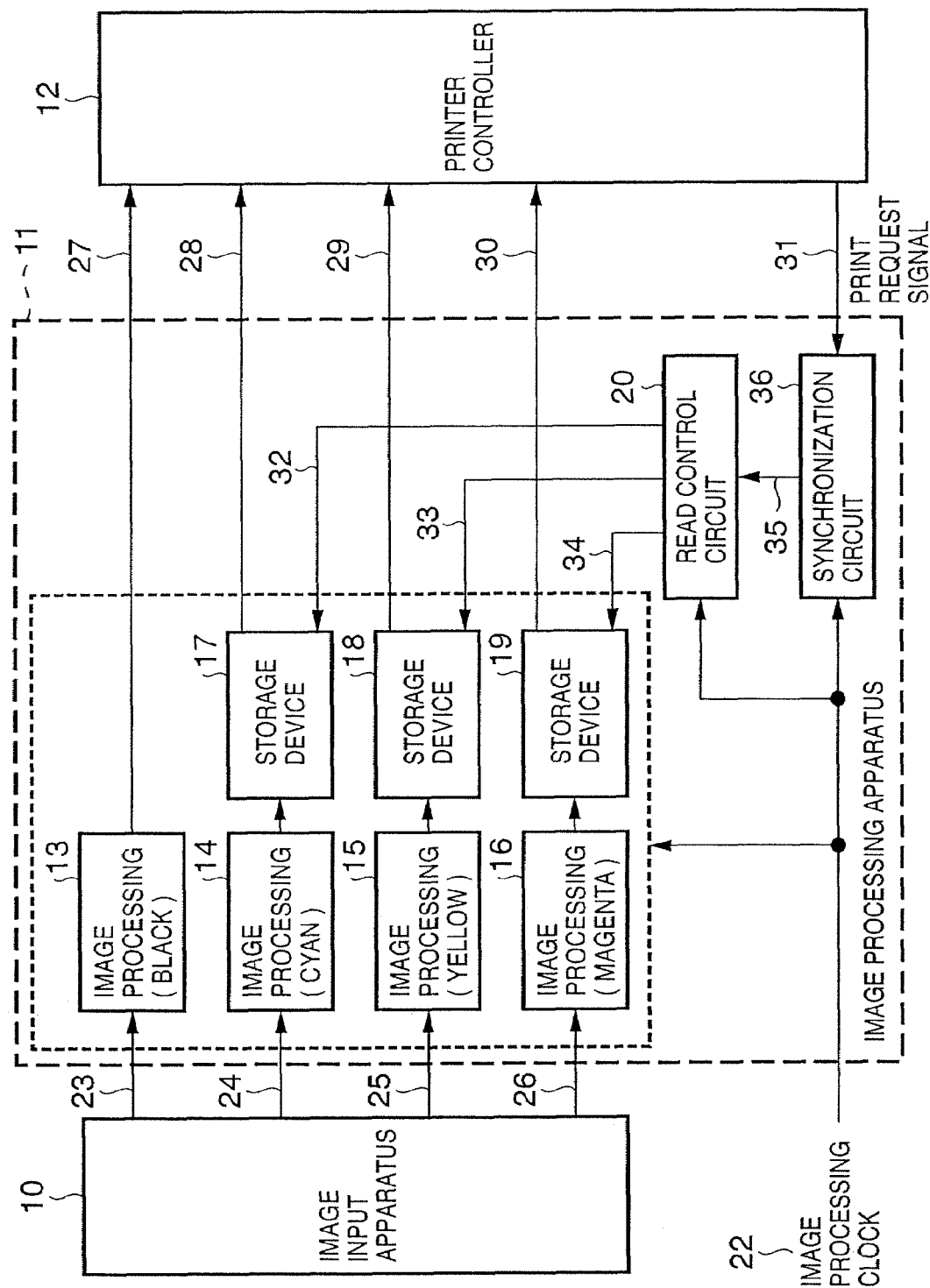
FIG. 2 is a block diagram showing a prior art.
Figure 3:
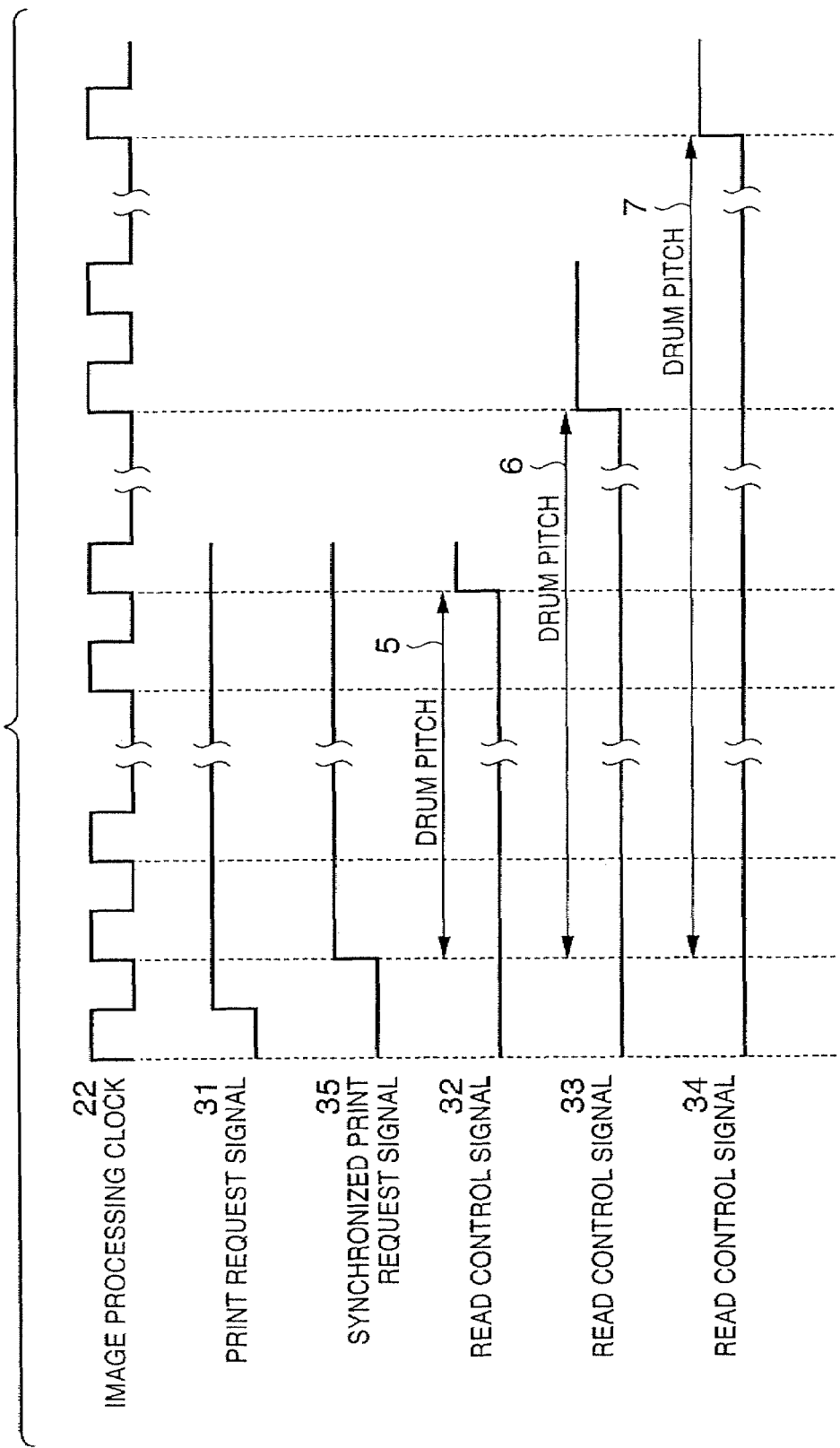
FIG. 3 is a timing chart showing the operation timing of the synchronization circuit and read control circuit.
Figure 4:
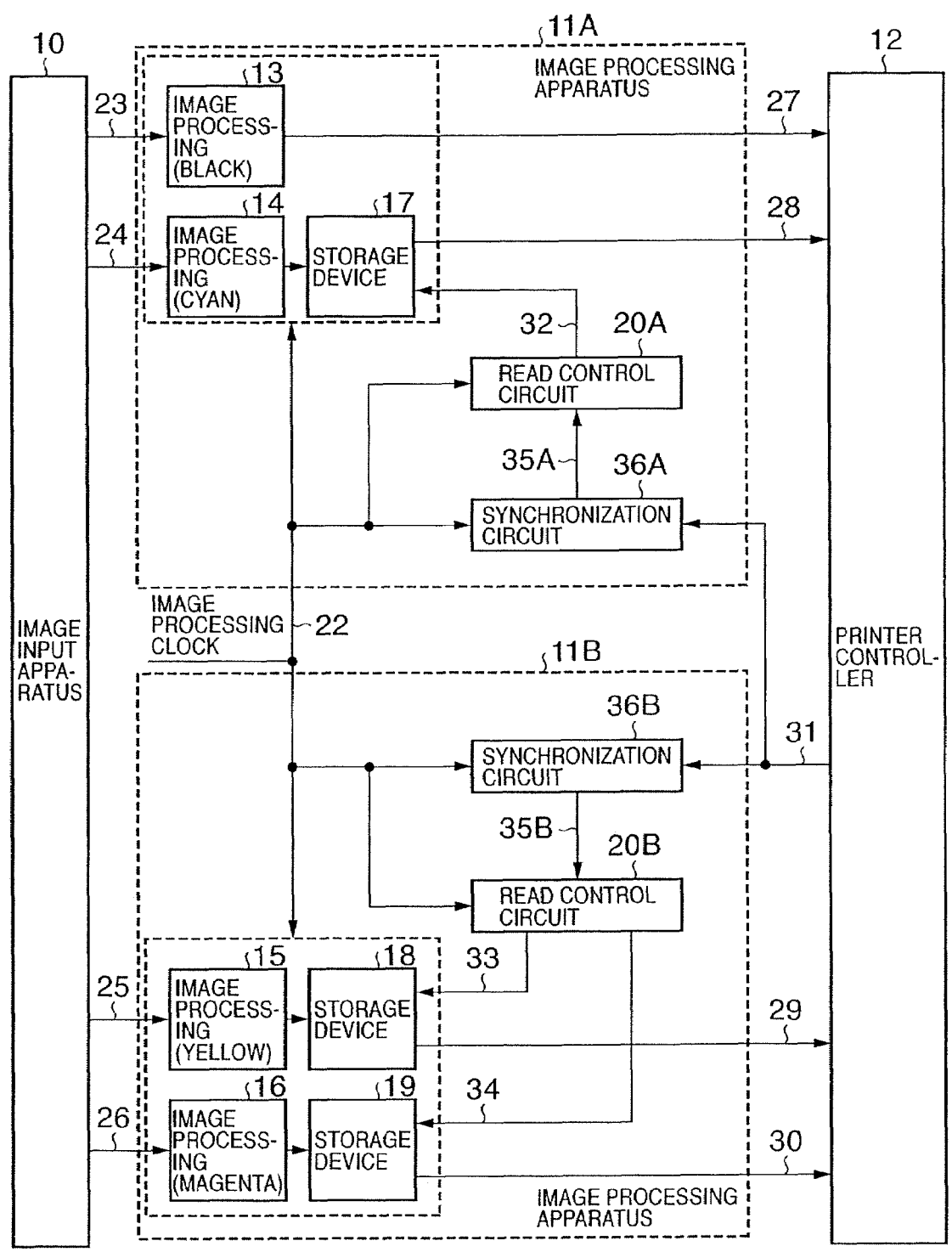
FIG. 4 is a block diagram showing another prior art.
Figure 5:
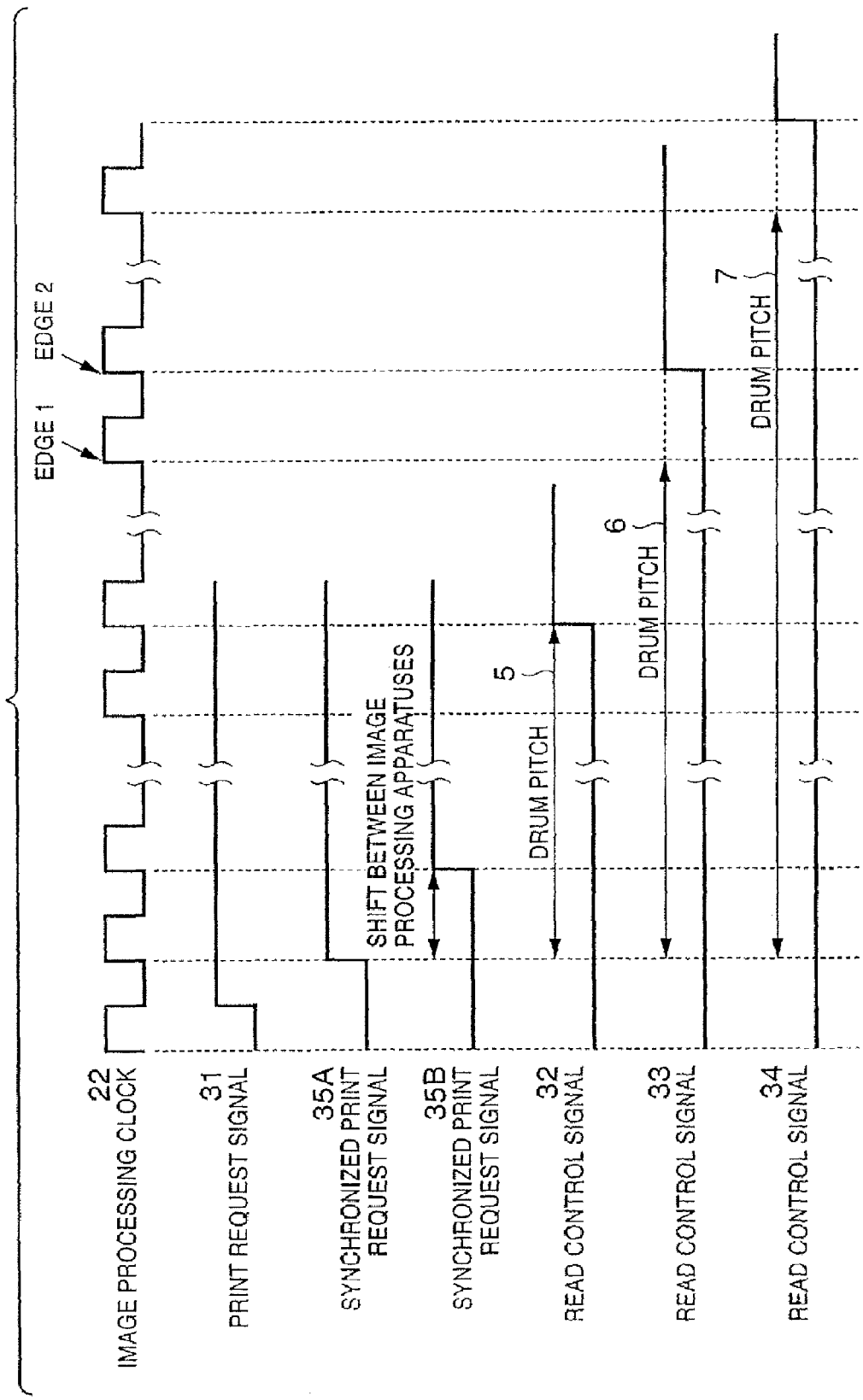
FIG. 5 is a timing chart showing a state wherein the timing of a read control signal shifts.
Figure 6:
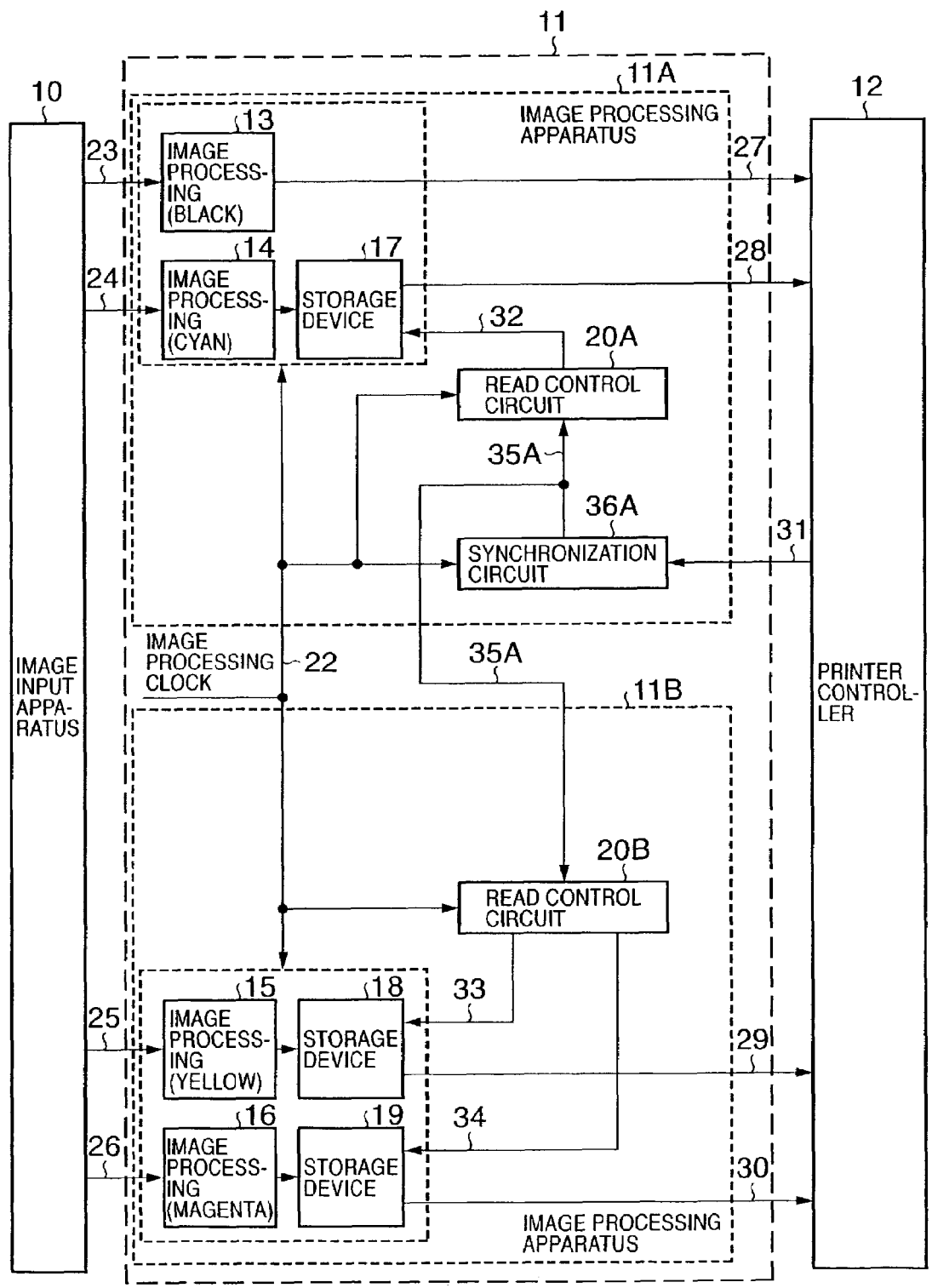
FIG. 6 is a block diagram showing the arrangement of an image processing system according to the first embodiment of the present invention.

FIG. 6 is a block diagram showing the arrangement of an image processing system according to the first embodiment of the present invention. This image processing system performs printing after adjusting the phase difference between color image signals due to drum pitches already described with reference to FIG. 1.

In the image processing system constituted by an image input apparatus 10, an image processing apparatus 11 formed from a plurality of semiconductor integrated circuits 11A and 11B, and a printer controller 12, image data 23 to 26 of the respective components input from the image input apparatus 10 undergo image processing operations 13 to 16, respectively.

The image processing operations for the components are parallelly executed for each pixel. To adjust delay amounts generated due to the drum pitches by storage devices 17 to 19, the data are stored in the storage devices 17 to 19, as needed. The storage device 17 to 19 may be mounted outside of the semiconductor integrated circuits 11A and 11B. This structure also can be applied to the other following embodiments.

A first output component 27 is output to the printer controller 12 without intervening any storage device because no phase adjustment is necessary for a photosensitive drum 1 (FIG. 1) of the printer, which prints first.

For a second output component 28, the image-processed data is stored in the storage device 17. In accordance with a read control signal 32 transmitted from a read control circuit 20A, the data is read out from the storage device 17 and output to the printer controller 12. At this time, a phase difference corresponding to a drum pitch 5 (FIG. 1) is adjusted.

For a third output component 29, the image-processed data is stored in the storage device 18. In accordance with a read control signal 33 transmitted from a read control circuit 20B, the data is read out from the storage device 18 and output to the printer controller 12. At this time, a phase difference corresponding to a drum pitch 6 (FIG. 1) is adjusted.

For a fourth output component 30, the image-processed data is stored in the storage device 19. In accordance with a read control signal 34 transmitted from the read control circuit 20B, the data is read out from the storage device 19 and output to the printer controller 12. At this time, a phase difference corresponding to a drum pitch 7 (FIG. 1) is adjusted.

A print request signal 31 transmitted from the printer controller 12 is input to a synchronization circuit 36A prepared in the semiconductor integrated circuit 11A of the image processing apparatus 11, synchronized by an image processing clock 22, and then input to the read control circuits 20A and 20B prepared respectively in the semiconductor integrated circuits of the image processing apparatuses 11A and 11B.

On the basis of a synchronized print request signal 35A, the read control circuit 20A in the image processing apparatus 11A adds, to the read control signal 32, a delay corresponding to the period in which the sheet surface is conveyed from the first photosensitive drum section 1 to the second photosensitive drum section 2, and transmits the delayed read control signal 32 to the storage device 17. Similarly, on the basis of the same synchronized print request signal 35A as that for the read control circuit 20A, the read control circuit 20B in the image processing apparatus 11B adds, to the read control signal 33, a delay corresponding to the period in which the sheet surface is conveyed from the first photosensitive drum section 1 to the third photosensitive drum section 3, and transmits the delayed read control signal 33 to the storage device 18. In addition, on the basis of the synchronized print request signal 35A, the read control circuit 20B also adds, to the read control signal 34, a delay corresponding to the period in which the sheet surface is conveyed from the first photosensitive drum section 1 to the fourth photosensitive drum section 4, and transmits the delayed read control signal 34 to the storage device 19.

In this way, the print request signal 35A output from the single synchronization circuit 36A is used for both of the two separate image processing apparatuses 11A and 11B. With this arrangement, even when the image processing apparatus is separated into two semiconductor integrated circuits, any shift in timing can be prevented.

Figure 11:
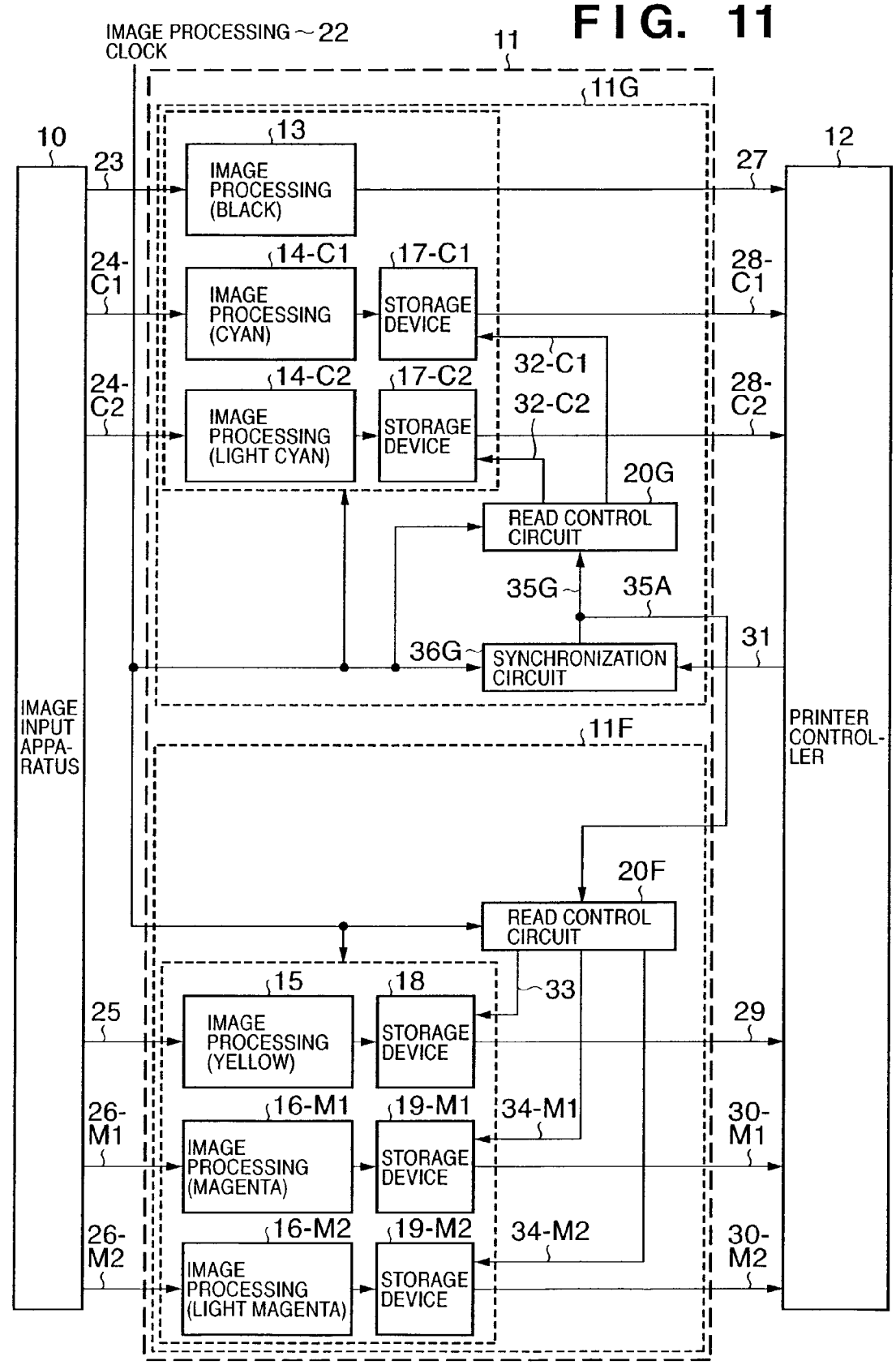
FIG. 11 is a block diagram showing the arrangement of an image processing system according to a modification to the first embodiment of the present invention.

FIG. 11 is a block diagram showing a modification to the first embodiment.

Referring to FIG. 11, an image processing apparatus 11 is constituted by semiconductor integrated circuits 11G and 11F and has an image processing function of generating six component data (e.g., black, cyan, light cyan, yellow, magenta, and light magenta).

Even when the number of output components is six, this arrangement makes it possible to prevent any shift in timing by controlling storage devices (17-C1, 17-C2, 18, 19-M1, and 19-M2) in the image processing apparatuses 11G and 11F on the basis of a print request signal 35A output from the image processing apparatus 11G.

Second Embodiment

Figure 7:
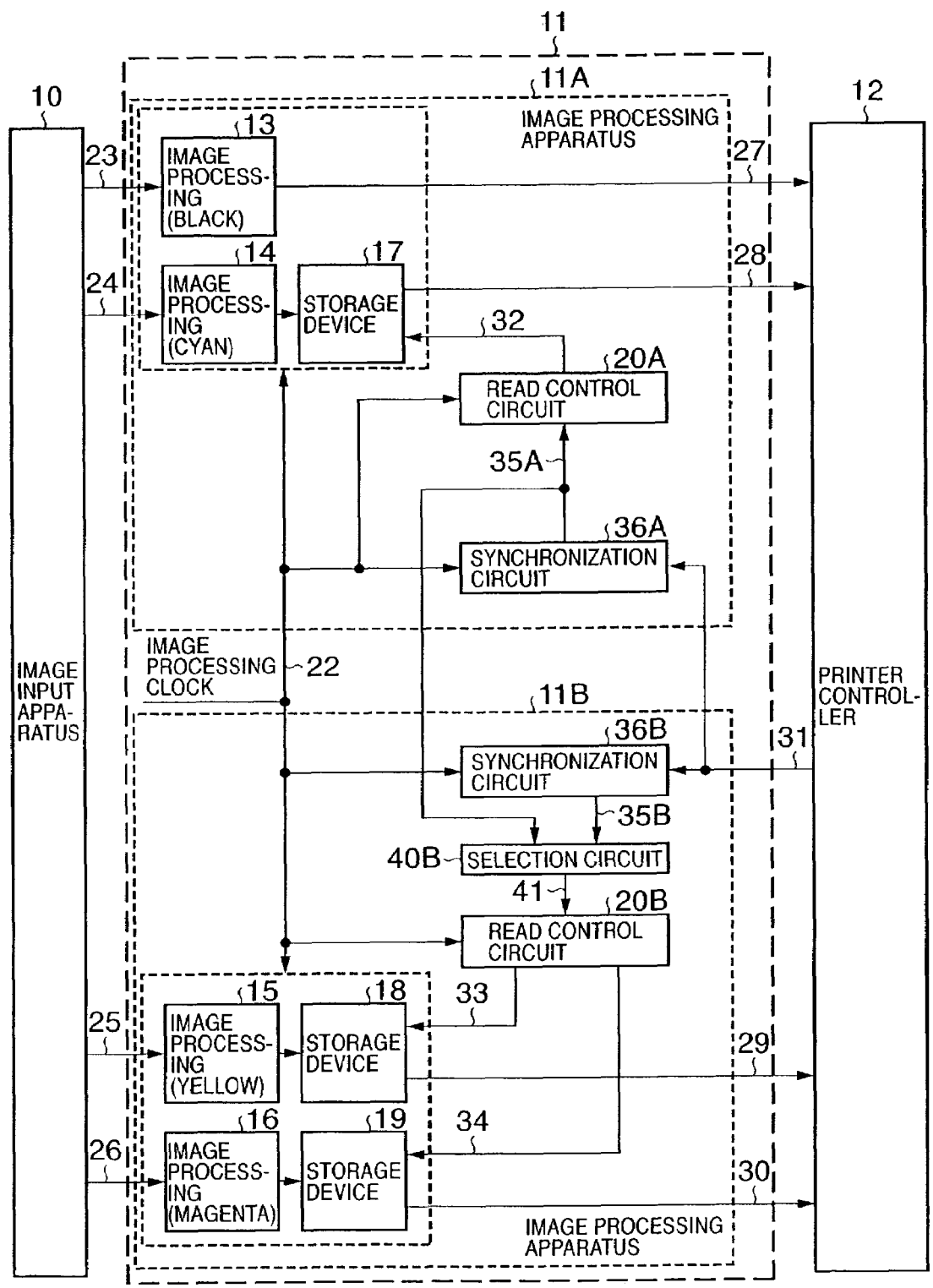
FIG. 7 is a block diagram showing the arrangement of an image processing system according to the second embodiment of the present invention.

FIG. 7 is a block diagram showing the arrangement of an image processing system according to the second embodiment of the present invention.

The difference between the first embodiment and the second embodiment will be described.

In the second embodiment, an image processing apparatus 11 is constituted by an image processing apparatus 11A as in the first embodiment, image processing sections 15 and 16 which process data input from an image input apparatus 10 on the basis of an image processing clock 22, storage devices 18 and 19 which store data output from the image processing sections, a synchronization circuit 36B which synchronizes a print request signal 31 input from a printer controller 12 with the image processing clock 22, a selection circuit 40 which selects one of a synchronized print request signal 35A output from the image processing apparatus 11A and a synchronized print request signal 35B output from the synchronization circuit 36B, and an image processing apparatus 11B having a read control circuit 20B which generates component read control signals from the synchronized print request signal. With this arrangement, the storage devices 18 and 19 can be controlled on the basis of either of the two image processing apparatuses 11A and 11B.

Figure 12:
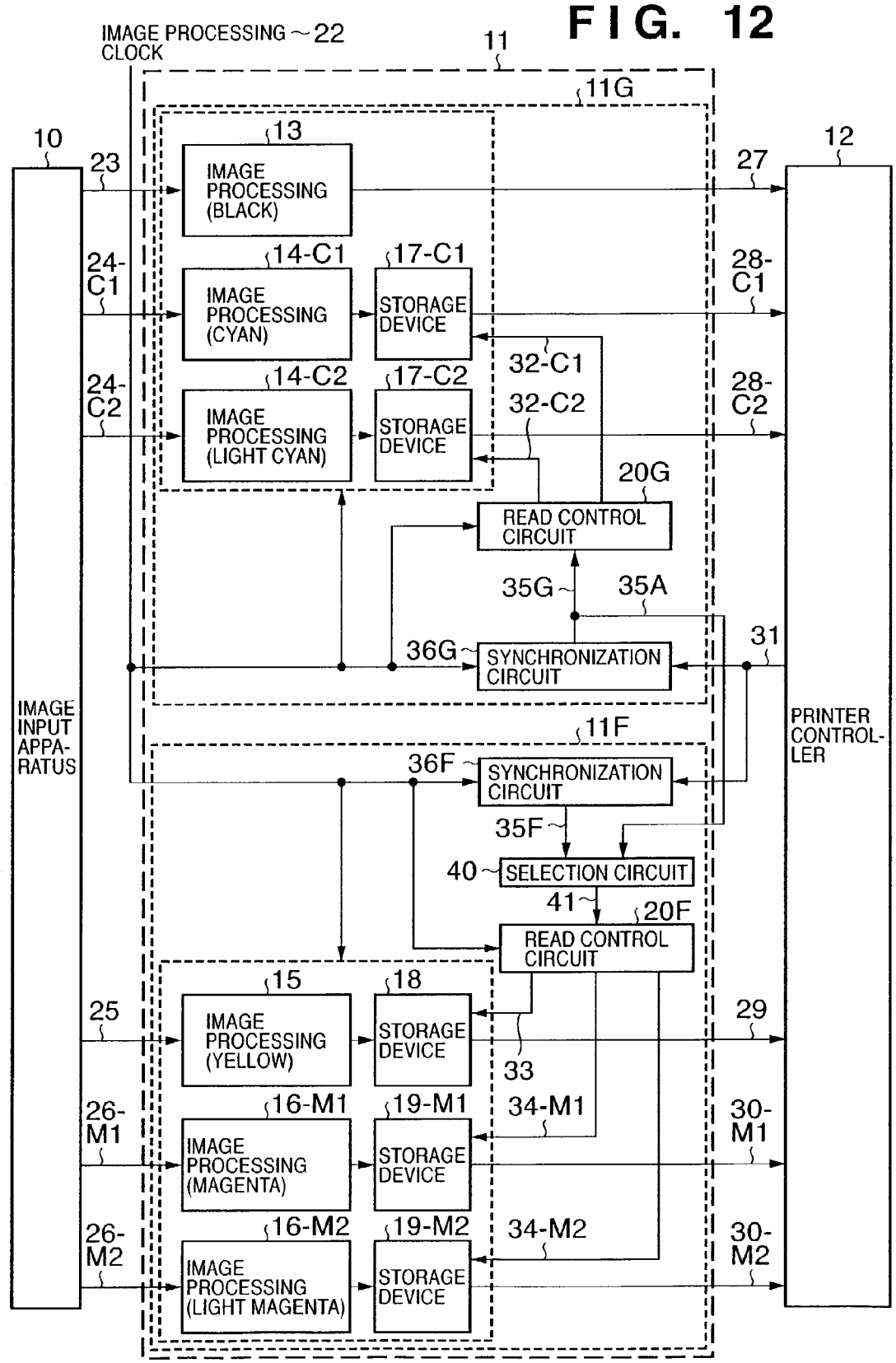
FIG. 12 is a block diagram showing the arrangement of an image processing system according to a modification to the second embodiment of the present invention.

FIG. 12 is a block diagram showing a modification to the second embodiment.

Referring to FIG. 12, the image processing apparatus 11 is constituted by semiconductor integrated circuits 11G and 11F and has an image processing function of generating six component data (e.g., black, cyan, light cyan, yellow, magenta, and light magenta).

Even when the number of output components is six, this arrangement makes it possible to control storage devices (17-C1, 17-C2, 18, 19-M1, and 19-M2) in the image processing apparatuses 11G and 11F on the basis of either of the two image processing apparatuses 11G and 11F.

Third Embodiment

Figure 8:
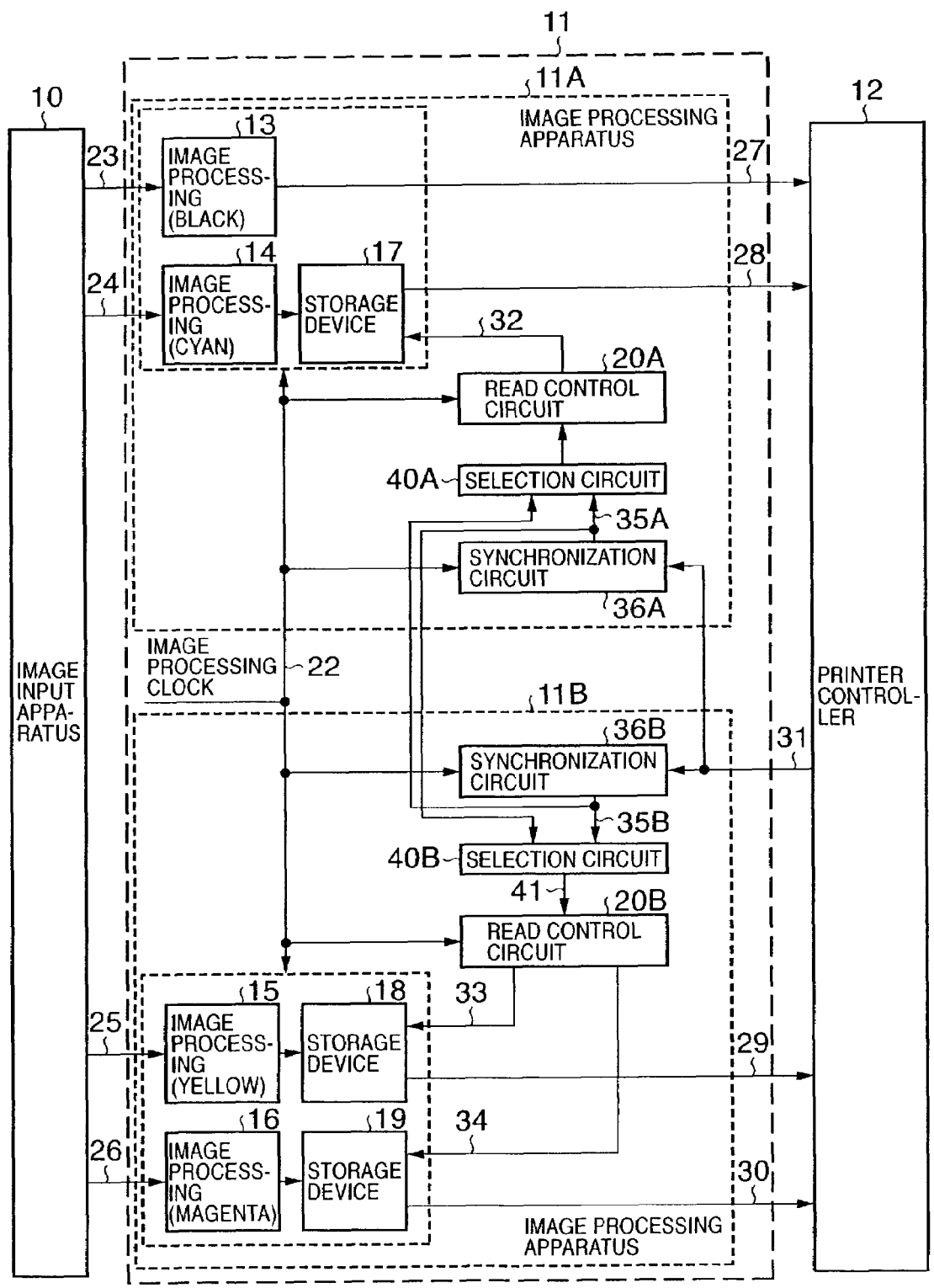
FIG. 8 is a block diagram showing the arrangement of an image processing system according to the third embodiment of the present invention.

FIG. 8 is a block diagram showing the arrangement of an image processing system according to the third embodiment of the present invention.

The difference between the second embodiment and the third embodiment will be described.

In the third embodiment, two image processing apparatuses 11A and 11B respectively have selection circuits 40A and 40B each of which selects one of a synchronized print request signal 35A synchronized by a synchronization circuit 36A in the image processing apparatus 11A and a synchronized print request signal 35B synchronized by a synchronization circuit 36B in the image processing apparatus 11B.

With this arrangement, storage devices 17, 18, and 19 can be controlled on the basis of either of the two image processing apparatuses 11A and 11B.

Figure 13:
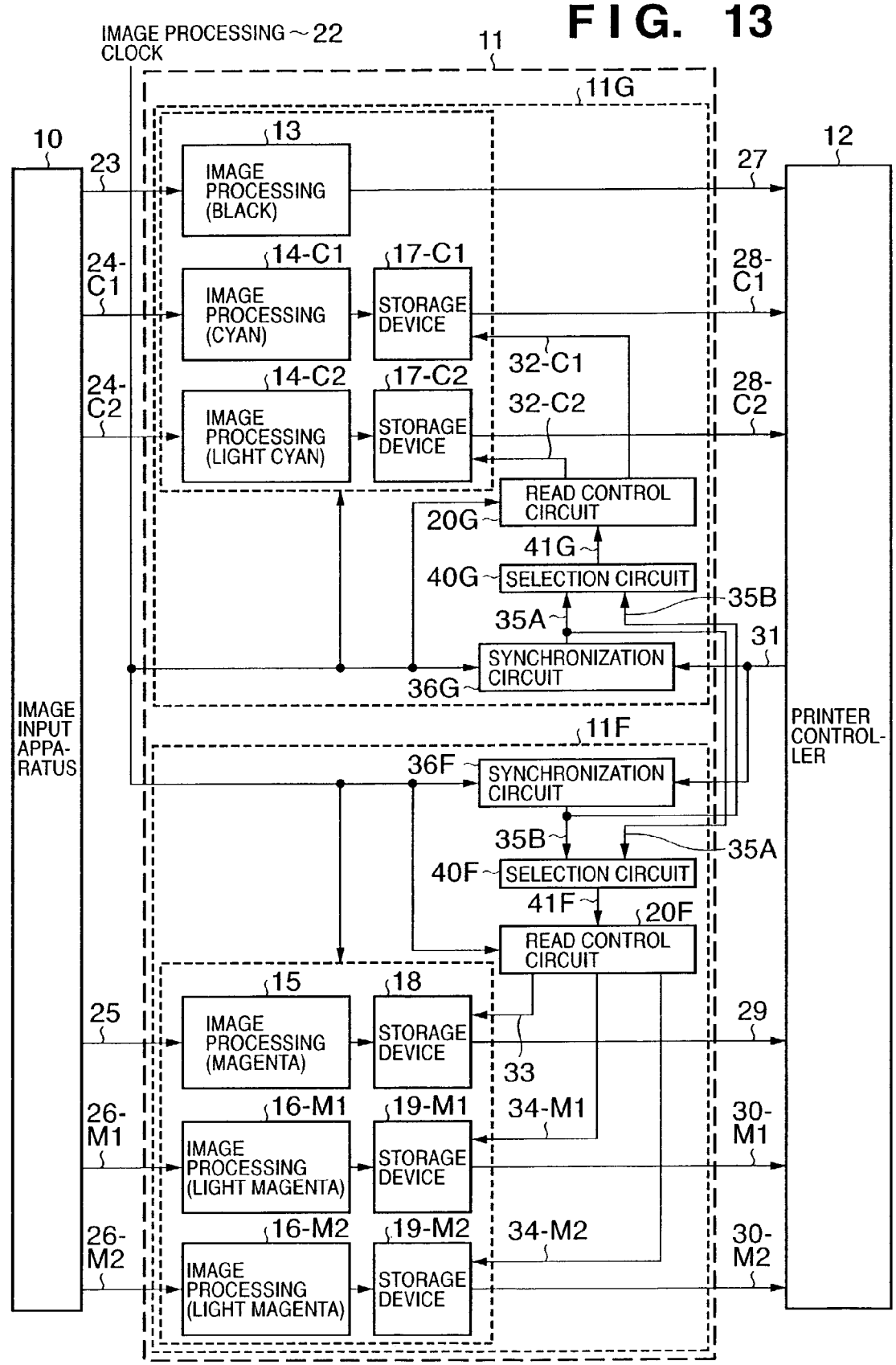
FIG. 13 is a block diagram showing the arrangement of an image processing system according to a modification to the third embodiment of the present invention.

FIG. 13 is a block diagram showing a modification to the third embodiment.

Referring to FIG. 13, an image processing apparatus 11 is constituted by semiconductor integrated circuits 11G and 11F and has an image processing function of generating six component data (e.g., black, cyan, light cyan, yellow, magenta, and light magenta).

Even when the number of output components is six (e.g., black, cyan, light cyan, yellow, magenta, and light magenta), storage devices (17-C1, 17-C2, 18, 19-M1, and 19-M2) can be controlled on the basis of either of the two image processing apparatuses 11G and 11F by selection circuits 40G and 40F each of which selects one of a synchronized print request signal 35A synchronized by a synchronization circuit 36A in the image processing apparatus 11G and a synchronized print request signal 35B synchronized by a synchronization circuit 36B in the image processing apparatus 11F.

Fourth Embodiment

Figure 9:
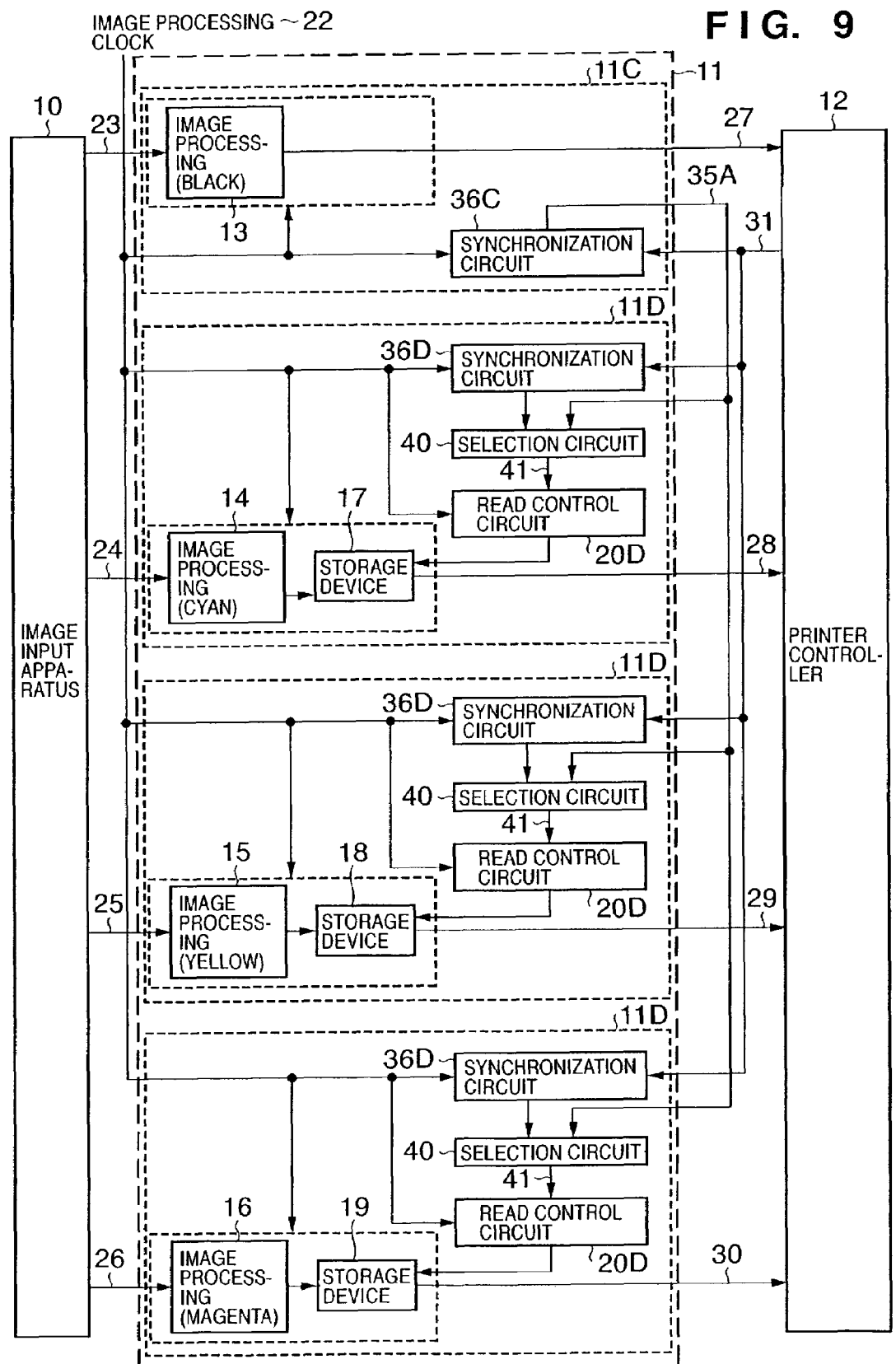
FIG. 9 is a block diagram showing the arrangement of an image processing system according to the fourth embodiment of the present invention.

FIG. 9 is a block diagram showing the arrangement of an image processing system according to the fourth embodiment of the present invention.

In this embodiment, an image processing apparatus 11 is constituted by image processing apparatuses 11C and 11D. The image processing apparatus 11C has an image processing section and a synchronization circuit which synchronizes a print request signal 31 input from a printer controller 12 with an image processing clock. The image processing apparatus 11C outputs one output component 27 to the printer controller 12. Each image processing apparatus 11D has an image processing section, a storage device, a synchronization circuit which synchronizes the print request signal 31 input from the printer controller 12 with the image processing clock, a selection circuit which selects one of a synchronized print request signal 35A input from the image processing apparatus 11C and a synchronized print request signal synchronized in that image processing apparatus 11D, and a read control circuit which outputs a read control signal on the basis of the synchronized print request signal output from the selection circuit. Each image processing apparatus 11D outputs a corresponding one of output components 28 to 30 to the printer controller 12.

With this arrangement, even in the image processing apparatus constituted by a plurality of semiconductor integrated circuits, a high print image quality can be obtained.

Figure 15:
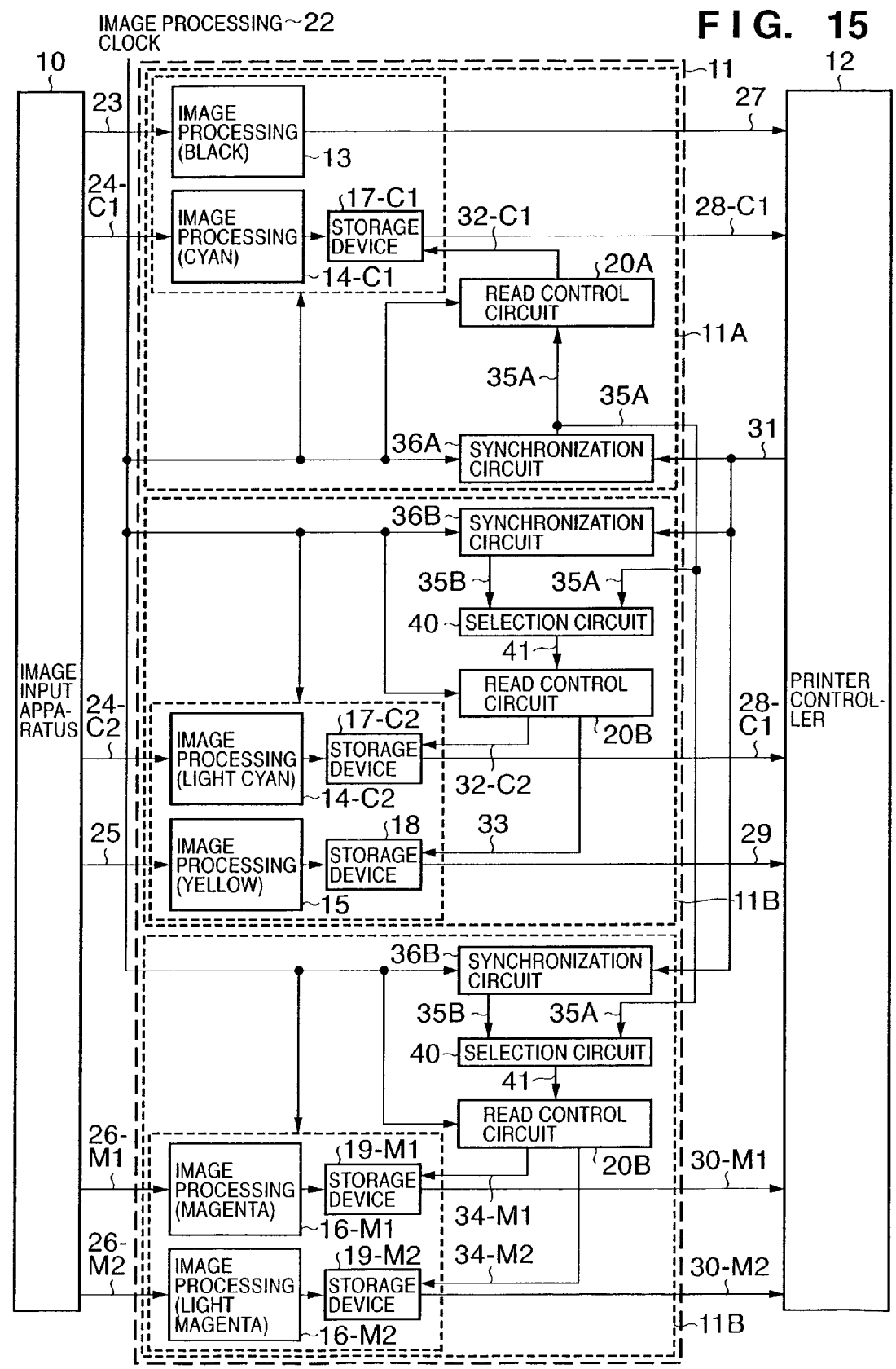
FIG. 15 is a block diagram showing the arrangement of an image processing system according to a modification to the fourth embodiment of the present invention.
Figure 17:
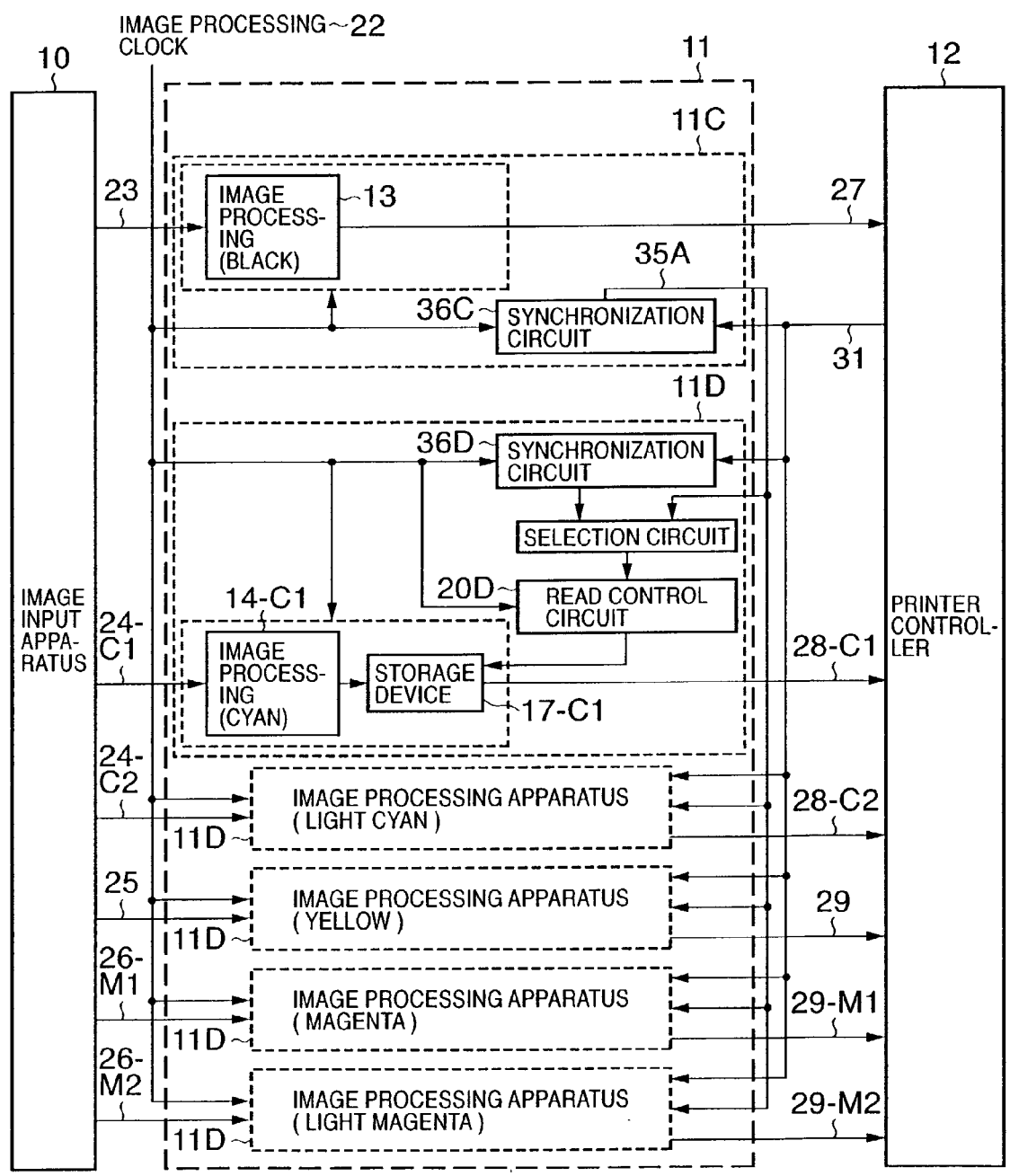
FIG. 17 is a block diagram showing the arrangement of an image processing system according to another modification to the fourth embodiment of the present invention.

FIGS. 15 and 17 are block diagrams showing modifications to the fourth embodiment.

Referring to FIG. 17, an image processing apparatus 11 is constituted by semiconductor integrated circuits 11C and 11D, as in FIG. 9, and has an image processing function of generating six component data (e.g., black, cyan, light cyan, yellow, magenta, and light magenta).

Even when the number of output components is six, this arrangement makes it possible to prevent any shift in timing by controlling storage devices (17-C1, 17-C2, 18, 19-M1, and 19-M2) in the image processing apparatuses 11D on the basis of a print request signal 35A output from the image processing apparatus 11C.

Referring to FIG. 15, an image processing apparatus 11 is constituted by semiconductor integrated circuits 11A and 11B, as in FIG. 7, and has an image processing function of generating six component data (e.g., black, cyan, light cyan, yellow, magenta, and light magenta).

Even in this case, this arrangement makes it possible to prevent any shift in timing by controlling storage devices (17-C1, 17-C2, 18, 19-M1, and 19-M2) in the image processing apparatuses 11B on the basis of a print request signal 35A output from the image processing apparatus 11A.

Fifth Embodiment

Figure 10:
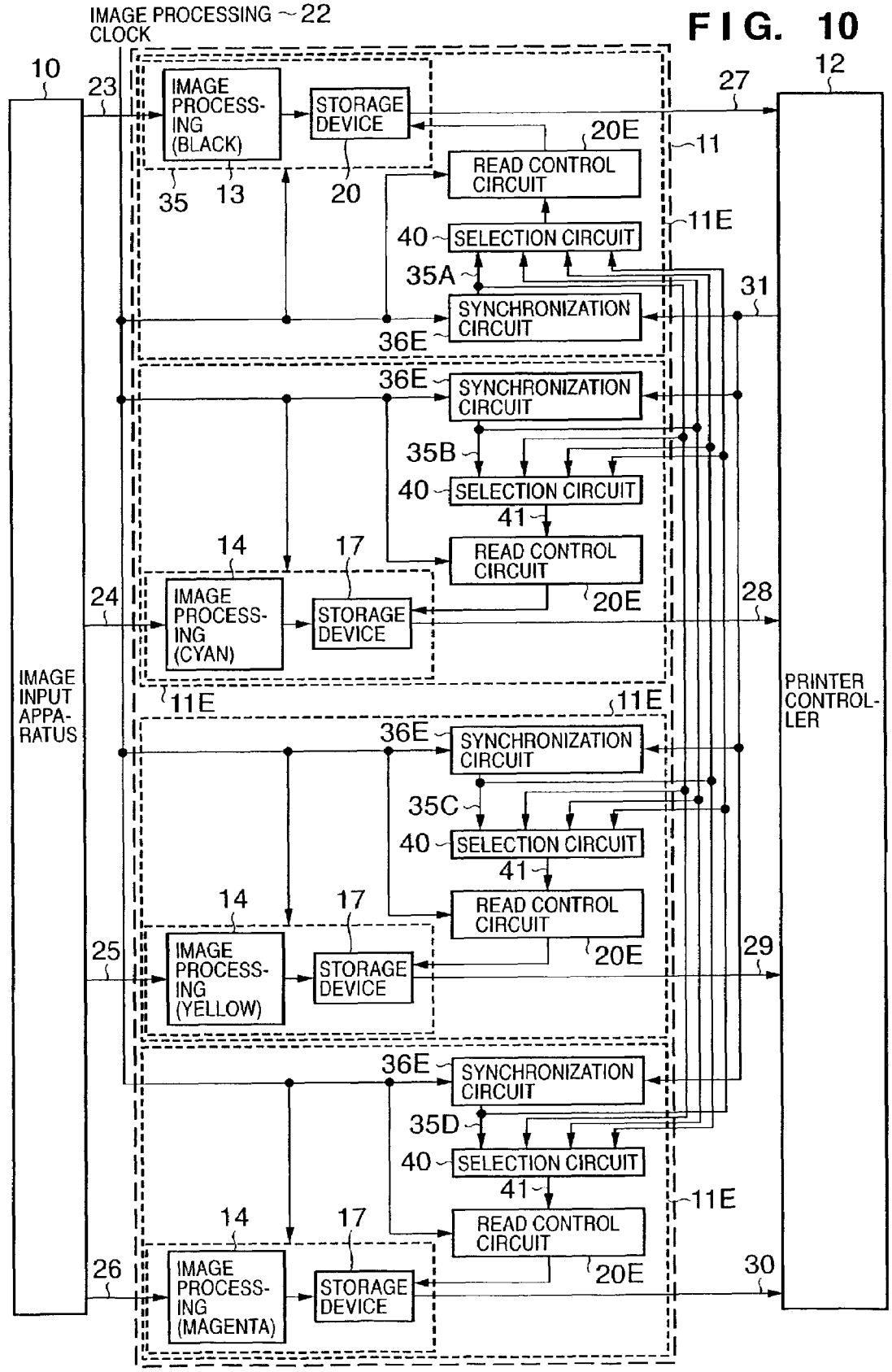
FIG. 10 is a block diagram showing the arrangement of an image processing system according to the fifth embodiment of the present invention.

FIG. 10 is a block diagram showing the arrangement of an image processing system according to the fifth embodiment of the present invention.

Image processing apparatuses 11E described in the fourth embodiment are mounted in parallel in number equal to output components. Each image processing apparatus 11E inputs a synchronized print request signal synchronized with an image processing clock to the remaining image processing apparatuses 11E. In each image processing apparatus 11E, a selection circuit selects one of the four synchronized print request signals.

With this arrangement, storage devices can be controlled on the basis of either of the plurality of image processing apparatuses 11E.

Figure 16:
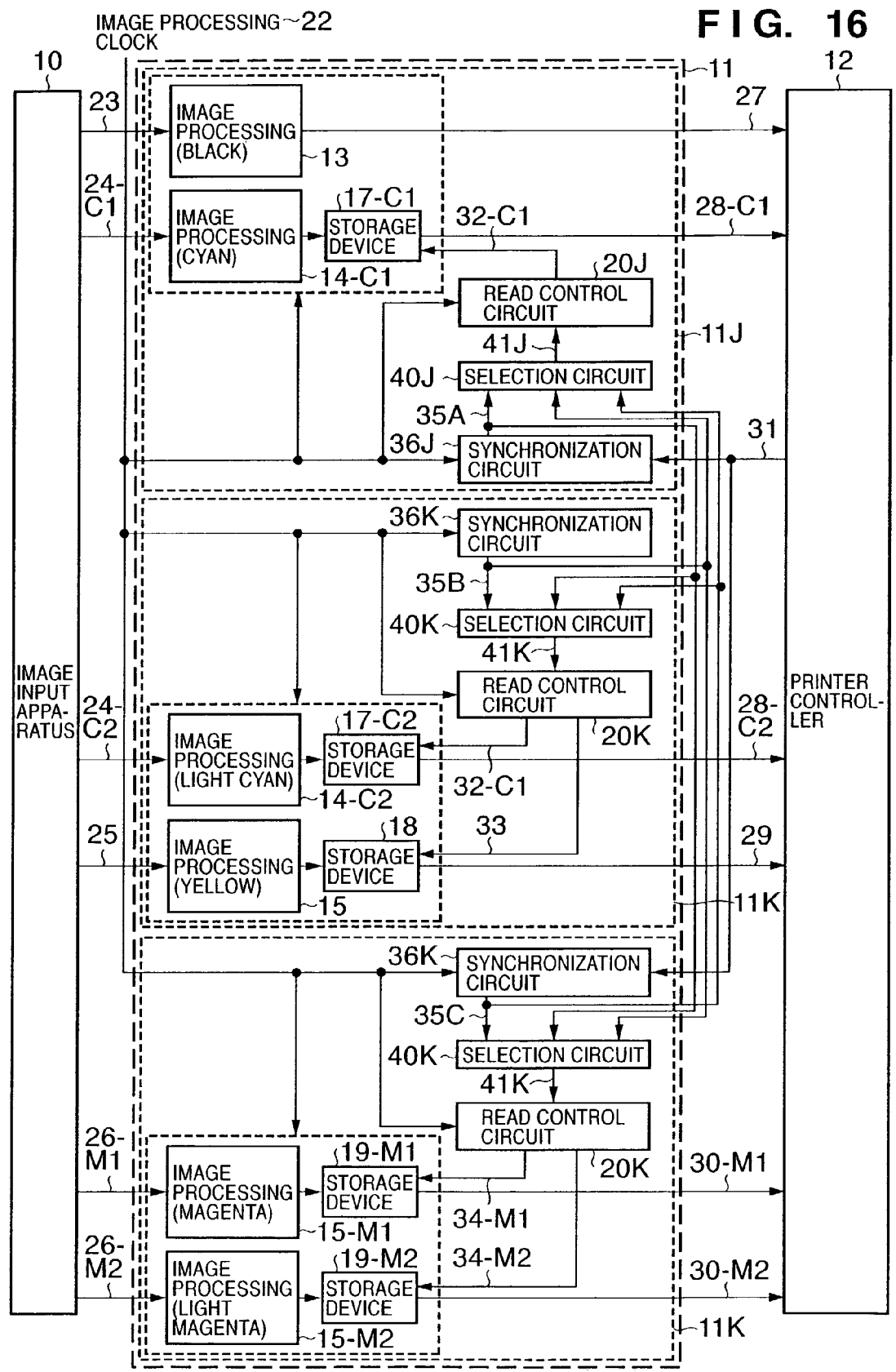
FIG. 16 is a block diagram showing the arrangement of an image processing system according to a modification to the fifth embodiment of the present invention.
Figure 18:
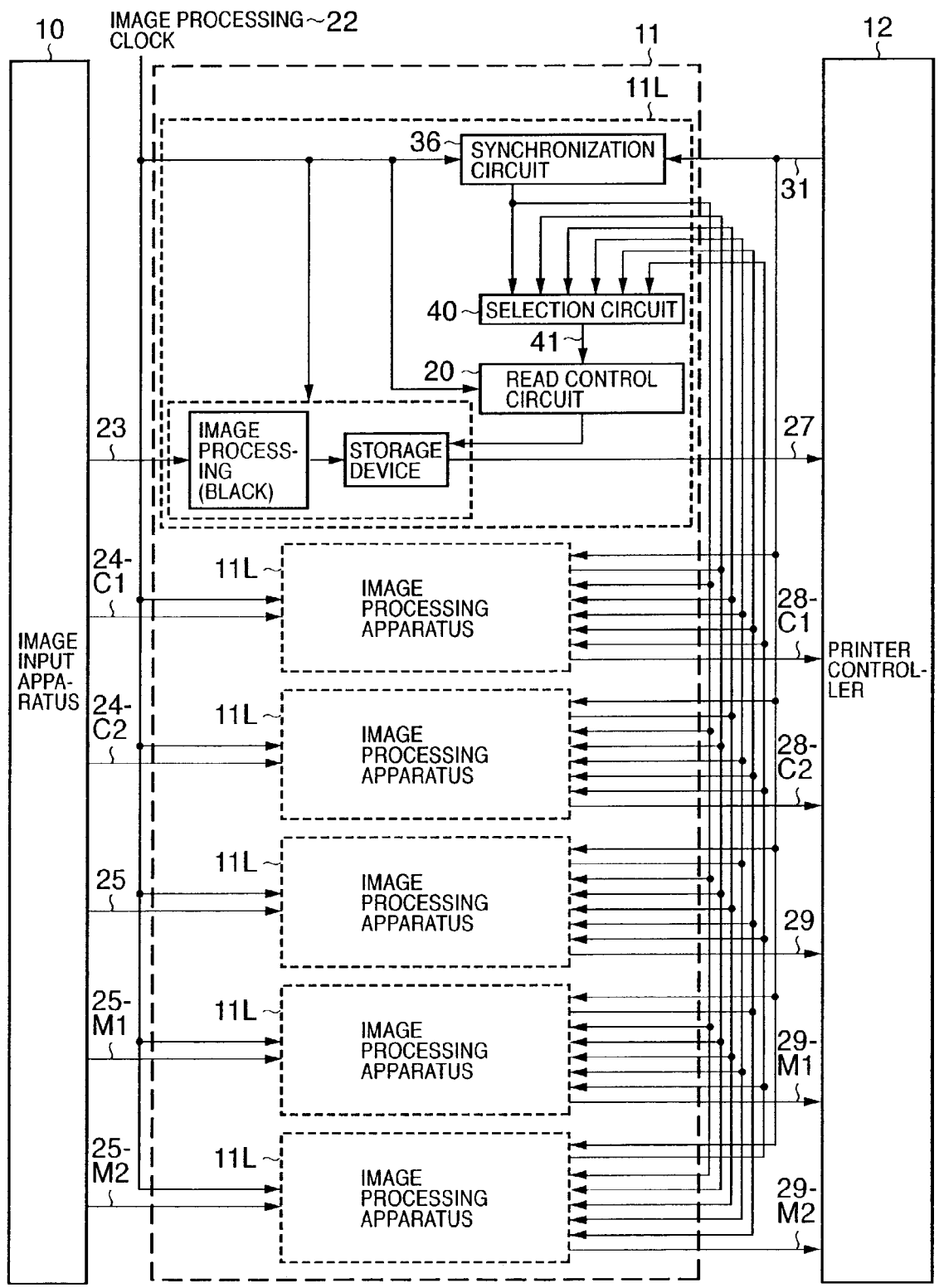
FIG. 18 is a block diagram showing the arrangement of an image processing system according to another modification to the fifth embodiment of the present invention.

FIGS. 16 and 18 are block diagrams showing modifications to the fifth embodiment.

Referring to FIG. 18, image processing apparatuses (11L) described in the fourth embodiment (FIG. 17) are mounted in parallel in number equal to output components. Each image processing apparatus 11L inputs a synchronized print request signal synchronized with an image processing clock to the remaining image processing apparatuses 11L. In each image processing apparatus 11L, a selection circuit selects one of the six synchronized print request signals.

Even in this case, the arrangement makes it possible to control storage devices in the image processing apparatuses 11L on the basis of either of the plurality of image processing apparatuses 11L.

Referring to FIG. 16, an image processing apparatus 11 is constituted by a plurality of semiconductor integrated circuits (11J and 11K) described in the third embodiment (FIG. 8). One image processing apparatus 11J and a plurality of image processing apparatuses 11K are mounted in parallel. Each of the image processing apparatuses 11J and 11K inputs a synchronized print request signal synchronized with an image processing clock to the remaining image processing apparatuses 11L and 11K. In each of the image processing apparatuses 11L and 11K, a selection circuit selects one of the three synchronized print request signals.

Even in this case, the arrangement makes it possible to control storage devices in the image processing apparatuses on the basis of either of the plurality of image processing apparatuses 11J and 11K.

Sixth Embodiment

Figure 14:
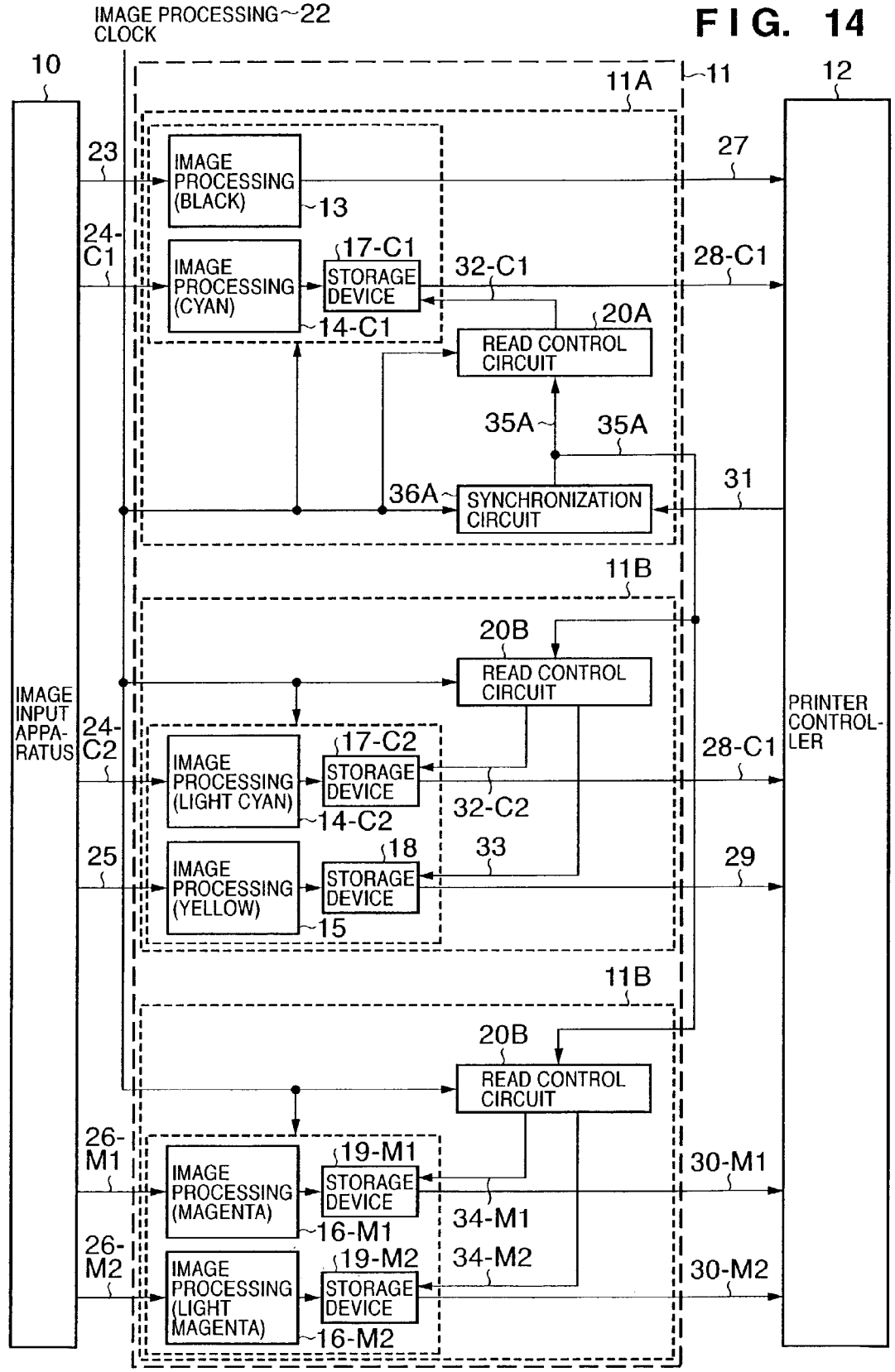
FIG. 14 is a block diagram showing the arrangement of an image processing system according to a modification to the sixth embodiment of the present invention.

FIG. 14 is a block diagram showing the arrangement of an image processing system according to the sixth embodiment of the present invention.

Referring to FIG. 14, an image processing apparatus 11 is constituted by semiconductor integrated circuits 11A and 11B described in the first embodiment (FIG. 6) and has an image processing function of generating six component data (e.g., black, cyan, light cyan, yellow, magenta, and light magenta). The image processing apparatus 11A inputs a synchronized print request signal synchronized with an image processing clock to each image processing apparatus 11B. In each image processing apparatus 11B, storage devices are controlled by the synchronized print request signal.

With this arrangement, the plurality of image processing apparatuses 11B can prevent any shift in timing by controlling storage devices (17-C2, 18, 19-M1, and 19-M2) in accordance with a print request signal 35A.

As described above, according to the above embodiments, even when the image processing apparatus cannot be mounted on a single semiconductor integrated circuit, storage devices in another image processing apparatus can accurately be controlled on the basis of a print request signal from the first image processing apparatus.

Even when storage devices in a plurality of image processing apparatuses are to be controlled by setting any one of the image processing apparatuses to the read standard, accurate control can be performed.

The image processing apparatuses can be constituted in accordance with the number of output components. The storage devices can accurately be controlled on the basis of any one of the image processing apparatuses.

Even when the image processing apparatus and printer controller use different operation clocks, the storage devices can accurately be controlled on the basis of any one of the image processing apparatuses.

According to the above effects, even when an image processing apparatus is implemented by a plurality of semiconductor integrated circuits, a high-quality print image can be obtained. In addition, flexible printing control corresponding to the printer system can be executed.

Other Embodiment

The object of the embodiments is achieved even by supplying a storage medium (or recording medium) which stores software program codes for implementing the functions of the above-described embodiments to a system or apparatus and causing the computer (or a CPU or MPU) of the system or apparatus to read out and execute the program codes stored in the storage medium. In this case, the program codes read out from the storage medium implement the functions of the above-described embodiments by themselves, and the storage medium which stores the program codes constitutes the present invention. The functions of the above-described embodiments are implemented not only when the readout program codes are executed by the computer but also when the operating system (OS) running on the computer performs part or all of actual processing on the basis of the instructions of the program codes.

The functions of the above-described embodiments are also implemented when the program codes read out from the storage medium are written in the memory of a function expansion board inserted into the computer or a function expansion unit connected to the computer, and the CPU of the function expansion board or function expansion unit performs part or all of actual processing on the basis of the instructions of the program codes.

As has been described above, according to the above embodiments, even when the image processing apparatus is divided into a plurality of semiconductor integrated circuits, any color misregistration in printing can be prevented.

The present invention is not limited to the above embodiments and various changes and modifications can be made within the spirit and scope of the present invention. Therefore, to apprise the public of the scope of the present invention, the following claims are made.

What is claimed is:

1. An image processing apparatus which is used for an image forming apparatus for executing image processing for each of plural color components and sequentially printing image processing results of the color components by a plurality of photosensitive drums separated by predetermined distances in a conveyance direction of a printing medium in correspondence with the color components and in which a plurality of image processing sections which execute image processing for respective ones of the color components are divided into a plurality of semiconductor integrated circuits, wherein at least two of the plurality of image processing sections have storage sections, said storage sections adjusting printing timings of the color components corresponding to the distances between the photosensitive drums, and wherein the image processing apparatus further comprises a synchronization circuit which synchronizes, with an image processing clock for image processing, a print request signal from a printer controller which controls printing operation, and the print request signal synchronized by said synchronization circuit is commonly used to adjust read timings of the storage sections of the plurality of image processing sections.

2. The apparatus according to claim 1, wherein said synchronization circuit is arranged in each of at least two of the plurality of image processing sections, and the image processing section comprises a selection circuit which selects one of a print request signal synchronized by said synchronization circuit of one image processing section and a print request signal synchronized by said synchronization circuit of the other image processing section.

3. The apparatus according to claim 1, wherein an operation frequency of the image processing apparatus is different from that of the printer controller.

4. An image processing method which is used for an image forming apparatus for executing image processing for each of plural color components and sequentially printing image processing results of the color components by a plurality of photosensitive drums separated by predetermined distances in a conveyance direction of a printing medium in correspondence with the color components and uses an image processing apparatus in which a plurality of image processing sections which execute image processing for respective ones of the color components are divided into a plurality of semiconductor integrated circuits, comprising: causing at least two of the plurality of image processing sections to have storage sections, wherein the storage sections adjust printing timings of the color components corresponding to the distances between the photosensitive drums, and synchronizing, with an image processing clock for image processing, a print request signal from a printer controller which controls printing operation, and commonly using the print request signal synchronized by the synchronization circuit to adjust read timings of the storage sections of the plurality of image processing sections.

5. The method according to claim 4, wherein the synchronization circuit is arranged in each of at least two of the plurality of image processing sections, and one of a print request signal synchronized by the synchronization circuit of one image processing section and a print request signal synchronized by the synchronization circuit of the other image processing section is selectively used.

6. The method according to claim 4, wherein an operation frequency of the image processing apparatus is different from that of the printer controller.

7. A control program, stored, in executable form, in a computer-readable storage medium, and characterized by causing a computer to execute the image processing method of claim 4.

8. A recording medium characterized by storing the control program of claim 7.

* * * * *